(12) United States Patent
Takashima et al.

(10) Patent No.: US 12,305,093 B2
(45) Date of Patent: May 20, 2025

(54) PRESSURE-SENSITIVE ADHESIVE ARTICLES

(71) Applicant: NITTO DENKO CORPORATION, Ibaraki (JP)

(72) Inventors: Atsushi Takashima, Ibaraki (JP); Yosuke Makihata, Ibaraki (JP); Ginji Mizuhara, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 991 days.

(21) Appl. No.: 16/970,660

(22) PCT Filed: Feb. 19, 2019

(86) PCT No.: PCT/JP2019/006149
§ 371 (c)(1),
(2) Date: Sep. 17, 2020

(87) PCT Pub. No.: WO2019/163788
PCT Pub. Date: Aug. 29, 2019

(65) Prior Publication Data
US 2021/0009864 A1 Jan. 14, 2021

(30) Foreign Application Priority Data

Feb. 21, 2018 (JP) .................................. 2018-028998
Jun. 29, 2018 (JP) .................................. 2018-125111
Jul. 23, 2018 (JP) .................................. 2018-137760

(51) Int. Cl.
*C09J 7/32* (2018.01)
*C09J 7/25* (2018.01)
*C09J 7/38* (2018.01)

(52) U.S. Cl.
CPC .............. *C09J 7/385* (2018.01); *C09J 7/255* (2018.01); *C09J 2301/122* (2020.08); *C09J 2301/124* (2020.08); *C09J 2301/302* (2020.08); *C09J 2301/502* (2020.08); *C09J 2433/00* (2013.01); *C09J 2467/006* (2013.01); *Y10S 428/906* (2013.01); *Y10T 428/2891* (2015.01)

(58) Field of Classification Search
None
See application file for complete search history.

(56) References Cited

U.S. PATENT DOCUMENTS

| 4,513,039 | A | * | 4/1985 | Esmay | ................... | C09J 133/08 |
| | | | | | | 522/182 |
| 4,522,870 | A | * | 6/1985 | Esmay | ................... | C09J 133/08 |
| | | | | | | 442/151 |
| 5,604,035 | A | | 2/1997 | Kojima et al. | | |
| 6,083,856 | A | * | 7/2000 | Joseph | ................... | D04H 1/435 |
| | | | | | | 442/361 |
| 2009/0292095 | A1 | * | 11/2009 | Niwa | ....................... | C09J 7/385 |
| | | | | | | 526/307.6 |
| 2010/0028671 | A1 | | 2/2010 | Mitsui et al. | | |
| 2010/0209703 | A1 | | 8/2010 | Takarada et al. | | |
| 2011/0284151 | A1 | * | 11/2011 | Kobayashi | ................. | C09J 7/22 |
| | | | | | | 428/354 |
| 2014/0315019 | A1 | | 10/2014 | Cho et al. | | |
| 2019/0144715 | A1 | * | 5/2019 | Iwase | .................... | C09J 201/00 |
| | | | | | | 428/352 |

FOREIGN PATENT DOCUMENTS

| CN | 101535435 A | 9/2009 |
| CN | 101805566 A | 8/2010 |
| CN | 103619979 A | 3/2014 |
| CN | 103781863 A | 5/2014 |
| CN | 104073177 A | 10/2014 |
| EP | 0 704 509 A1 | 4/1996 |
| JP | S59-98184 A | 6/1984 |
| JP | H3-231980 A | 10/1991 |
| JP | H4-76080 A | 3/1992 |
| JP | H8-100161 A | 4/1996 |
| JP | H10-231464 A | 9/1998 |
| JP | H10-306267 A | 11/1998 |
| JP | 2001-342447 A | 12/2001 |
| JP | 4579226 B2 | 11/2010 |
| JP | 2011-162586 A | 8/2011 |
| JP | 2011-246501 A | 12/2011 |
| JP | 2013-1865 A | 1/2013 |
| JP | 2014-189778 A | 10/2014 |
| JP | 2015-193760 A | 11/2015 |

(Continued)

OTHER PUBLICATIONS

English translation of Japanese Patent Publication No. 2013001865, published Jan. 7, 2013 (Year: 2013).*
The Extended European Search Report issued on Jan. 26, 2022 for corresponding European Patent Application No. 19756822.3.
International Search Report issued for corresponding International Patent Application No. PCT/JP2019/006149 on May 7, 2019, along with an English translation.

(Continued)

*Primary Examiner* — Anish P Desai

(74) *Attorney, Agent, or Firm* — HAUPTMAN HAM, LLP

(57) ABSTRACT

Provided is an adhesive article which requires no separator and exhibits sufficient adhesive force without the need of any operation for adhesive-force development and in which the adhesive layer, even when in contact with itself, can be peeled off at the interface. The adhesive article includes an adhesive body including an adhesive layer, wherein the adhesive layer has a gel content of 5-70%, the adhesive article, through 7-day storage at 40° C., has a change in the gel content of the adhesive layer of −5% to 5%, and surface portions of the adhesive layer are in contact with each other.

5 Claims, 3 Drawing Sheets

(56) References Cited

FOREIGN PATENT DOCUMENTS

WO     WO-2020071508 A1 * 4/2020   ............ C09J 133/08

OTHER PUBLICATIONS

Written Opinion issued for corresponding International Patent Application No. PCT/JP2019/006149 on May 7, 2019.

Office Action issued on May 20, 2022 for corresponding Chinese Patent Application No. 201980014498.8, along with an English translation (13 pages).

Office Action issued on Nov. 16, 2022, for corresponding Chinese Patent Application No. 201980014498.8, along with an English translation (9 pages).

Office Action issued on Dec. 6, 2022, for corresponding Japanese Patent Application No. 2019-027782, along with an English translation (10 pages).

Office Action issued on Feb. 22, 2023 for corresponding Chinese Patent Application No. 201980014498.8, along with an English translation (7 pages).

Office Action issued on Feb. 23, 2023 for corresponding Taiwanese Patent Application No. 108105784, along with an English translation (13 pages).

Office Action issued on Apr. 6, 2023 for corresponding Korean Patent Application No. 10-2020-7023984, along with an English machine translation (8 pages).

Communication pursuant to Article 94(3) EPC issued on Mar. 4, 2024 for corresponding European Patent Application No. 19 756 822.3 (5 pages).

Office Action issued on Apr. 2, 2024 for corresponding Japanese Patent Application No. 2023-085568, along with an English machine translation (7 pages).

Office Action issued on May 29, 2024 for corresponding Korean Patent Application No. 10-2024-7000426, along with an English machine translation (8 pages).

Office Action issued on Jan. 24, 2025 for corresponding Taiwanese Patent Application No. 112138033, along with an English translation (13 pages).

* cited by examiner

PRESSURE-SENSITIVE ADHESIVE ARTICLES

CROSS REFERENCE TO RELATED APPLICATION

This present application is a national stage filing under 35 U.S.C § 371 of PCT application number PCT/JP2019/006149 filed on Feb. 19, 2019, which designates the United States and was published in Japan, and which claims priority to Japanese Patent Application Nos. 1) 2018-028998 filed on Feb. 21, 2018; 2) 2018-125111 filed on Jun. 29, 2018; and 3) 2018-137760 filed on Jul. 23, 2018 in the Japanese Patent Office. The disclosures of the above-listed applications are hereby incorporated by reference herein in their entireties.

TECHNICAL FIELD

The present invention relates to an adhesive article, more particularly, an adhesive article which requires no separator.

BACKGROUND ART

Adhesive sheets and adhesive tapes are used in, for example, bonding various adherends including metals, glasses, wood, paper, corrugated boards, and plastic materials. The adhesive sheets are usually in such a state that the adhesive surface is protected with a separator (release sheet) in order to protect the adhesive surface until application to an adherend. In the case of a wound form such as an adhesive-tape roll, use is made of a substrate in which the back surface that is in contact with an adhesive surface has undergone a release treatment, in order to facilitate unwinding.

For example, Patent Document 1 describes an adhesive sheet obtained by applying an aqueous-dispersion type pressure-sensitive adhesive composition to a separator substrate and thermally crosslinking the composition to form an adhesive layer.

However, the separators in adhesive sheets employing separators are peeled off in using the adhesive sheets and are discarded thereafter. Use of separators is hence undesirable from the standpoints of resource saving and cost reduction. Furthermore, there is a problem in that in cases when the user is wearing gloves or when the adhesive sheet or adhesive tape to be used is too small, then the separator cannot be efficiently peeled from the adhesive sheet or the adhesive tape cannot be efficiently unwound. It is hence considered to be useful if an adhesive sheet or adhesive tape that requires neither a separator nor a release treatment of the substrate back surface can be provided.

Such adhesive sheets have been proposed. Patent Document 2 describes a heat-sensitive adhesive composition which has low adhesiveness at ordinary temperature but exhibits adhesiveness when heated and which is useful in adhesive sheets, adhesive tapes, and the like. Patent Document 2 further describes a heat-sensitive adhesive sheet including an adhesive layer constituted of the heat-sensitive adhesive composition.

Patent Document 3 describes a hot-melt adhesive obtained by coating a yarn- or tape-shaped core material with a hot-melt adhesive.

Patent Document 4 describes a yarn-shaped adhesive obtained by adhering an adhesive to a yarn-shaped core material and then winding the core material around a reel without using a release paper.

CITATION LIST

Patent Literature

Patent Document 1: Japanese Patent No. 4579226
Patent Document 2: JP-A-10-231464
Patent Document 3: JP-A-04-76080
Patent Document 4: JP-A-03-231980

SUMMARY OF INVENTION

Technical Problems

However, the adhesive sheet described in Patent Document 1 employs a separator.

Heat-sensitive adhesive sheets and hot-melt adhesives such as those described in Patent Documents 2 and 3 have the following problems because the adhesives exhibit adhesiveness upon heating. First, the heat-sensitive adhesive sheets require a heat source for causing the adhesive sheets to exhibit adhesiveness. Secondly, it is difficult to use the heat-sensitive adhesive sheets in use environments where the adhesive sheets are heated after application to adherends, that is, the heat-sensitive adhesive sheets have poor storage stability. Thirdly, in cases when the heat-sensitive adhesive sheets are of the type which, in the state of being in contact with an adherend, are heated and thereby made to exhibit adhesiveness by heating, it is difficult to apply the heat-sensitive adhesive sheets to adherends having poor heat resistance. Fourthly, in cases when the heat-sensitive adhesive sheets (adhesive tapes) are in a form including a substrate, it is difficult to use substrates having poor heat resistance.

The yarn-shaped adhesive described in Patent Document 4 is for use in bonding substances which do not require high adhesive force, and does not exhibit high adhesive force.

An object of the present invention, in view of those problems, is to provide an adhesive article which requires no separator and exhibits sufficient adhesive force without the need of any operation for adhesive-force development and in which the adhesive layer, even when in contact with itself, can be peeled off at the interface.

Solution to the Problems

The present inventor diligently made investigations in order to overcome the problems. As a result, the inventor has discovered that an adhesive showing a small change in gel content gives an adhesive article which can be easily peeled off or unwound even when the adhesive layer is in direct contact with itself without a separator interposed therebetween and even when the adhesive has sufficient adhesive force. The present invention has been thus completed.

Namely, one aspect of the present invention relates to an adhesive article including an adhesive body including an adhesive layer, wherein the adhesive layer has a gel content of 5-70%, the adhesive article, through 7-day storage at 40° C., has a change in the gel content of the adhesive layer of −5% to 5%, and surface portions of the adhesive layer are in contact with each other.

Another aspect of the present invention relates to an adhesive article including an adhesive body including an adhesive layer, wherein the adhesive layer has a gel content of 5-70%, surface portions of the adhesive layer are in contact with each other, and the portions of the adhesive layer which are in contact with each other are capable of being separated from each other at the interface therebetween after 7-day storage at 40° C.

In an aspect of the present invention, the adhesive layer may include at least one adhesive selected from the group consisting of acrylic adhesives, urethane-based adhesives, silicone-based adhesives, rubber-based adhesives, and polyester-based adhesives.

In an aspect of the present invention, the adhesive layer may include an acrylic adhesive.

In an aspect of the present invention, it is preferable that the adhesive body is sheet-shaped.

In an aspect of the present invention, it is preferable that the adhesive body further includes a substrate and the adhesive layer is disposed on at least one surface of the substrate.

In an aspect of the present invention, it is preferable that the adhesive body is linear.

In an aspect of the present invention, it is preferable that the adhesive body further includes a linear core material and a longitudinal-direction surface of the core material is covered with the adhesive layer.

In an aspect of the present invention, the adhesive body may be in a form obtained by winding the adhesive body into a roll or be in a form obtained by stacking a plurality of layers of the adhesive body.

Advantageous Effects of Invention

In the adhesive article according to one aspect of the present invention, even when surface portions of the adhesive layer are in contact with each other, the surface portions are less apt to adhere to each other and can be separated from each other at the interface of the adhesive layer. This adhesive article hence requires neither a separator nor a release treatment of a separator. Furthermore, this adhesive article exhibits sufficient adhesive force in application to adherends without requiring an operation for adhesive-force development, and hence has excellent applicability.

DESCRIPTION OF EMBODIMENTS

Figure 1:
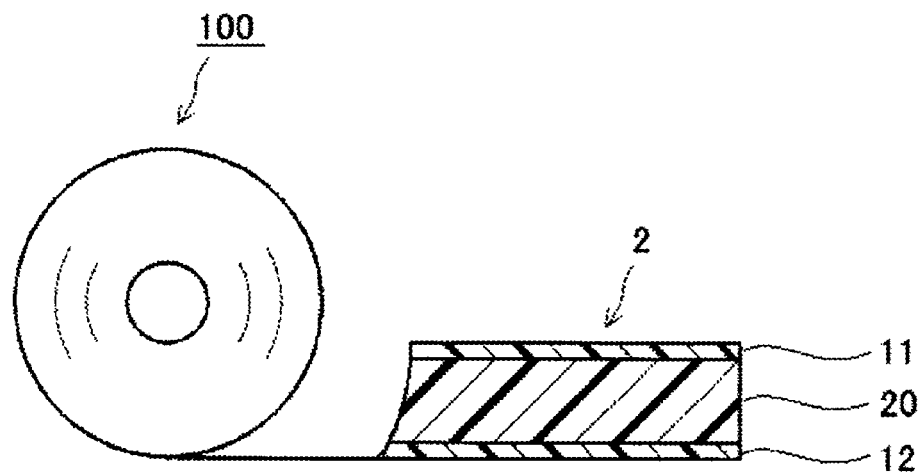
FIG. 1 is a schematic cross-sectional view of one configuration example of an adhesive article.

Embodiments of the present invention are described in detail below.

In the following drawings, members and portions having the same function are sometimes explained using the same signs, and duplicates of explanation are sometimes omitted or simplified. Furthermore, the embodiments in the drawings are schematically shown in order to clearly describe the present invention, and do not always correctly show the sizes and scales of actual products.

The adhesive article according to an embodiment of the present invention is an adhesive article including an adhesive body including an adhesive layer, wherein the adhesive layer has a gel content of 5-70%, surface portions of the adhesive layer are in contact with each other, and the portions of the adhesive layer which are in contact with each other are capable of being separated from each other at the interface therebetween after 7-day storage at 40° C.

The adhesive article according to this embodiment requires no separator since it is an adhesive article which includes an adhesive body including an adhesive layer and in which surface portions of the adhesive layer are in contact with each other, the portions of the adhesive layer which are in contact with each other being capable of being separated from each other at the interface therebetween after having been bonded to each other.

The adhesive article according to this embodiment, in which surface portions of the adhesive layer of the adhesive body are in contact with each other, may be an adhesive article which is in a form obtained by winding the adhesive body into a roll or is in a form obtained by stacking a plurality of layers of the adhesive body. Moreover, the adhesive article may be one obtained by stacking adhesive bodies processed into various shapes.

The adhesive body according to this embodiment may be sheet-shaped or linear. The adhesive body may further include a substrate, but may be an adhesive body including no substrate and constituted only of an adhesive layer.

In the case where the adhesive body is sheet-shaped, this adhesive body may further include a substrate and the adhesive layer may be disposed on at least one surface of the substrate. It is, however, preferable that the adhesive layer is disposed on each of both surfaces of the substrate. The term "sheet" herein means a conception which can include materials called tape, label, film, etc.

FIG. 1 shows one configuration example of an adhesive article according to this embodiment. The adhesive article 100 may be in a form obtained by spirally winding a sheet-shaped adhesive body 2 around a core or may be in a form obtained by winding a sheet-shaped adhesive body 2 without a core, as shown in FIG. 1. The adhesive body 2 may be, for example, a double-faced adhesive sheet having the cross-sectional structure shown in FIG. 1. The adhesive body 2 is configured of a substrate 20 and of a first adhesive layer 11 and a second adhesive layer 12 which are disposed respectively on first and second surfaces of the substrate 20. In the adhesive article 100 thus configured, a surface of the second adhesive layer 12 is in contact with a surface of the first adhesive layer 11. The outermost surface of the adhesive article 100 may be protected with a separator, etc., or the adhesive article 100 may be put in a case, etc.

Figure 2:
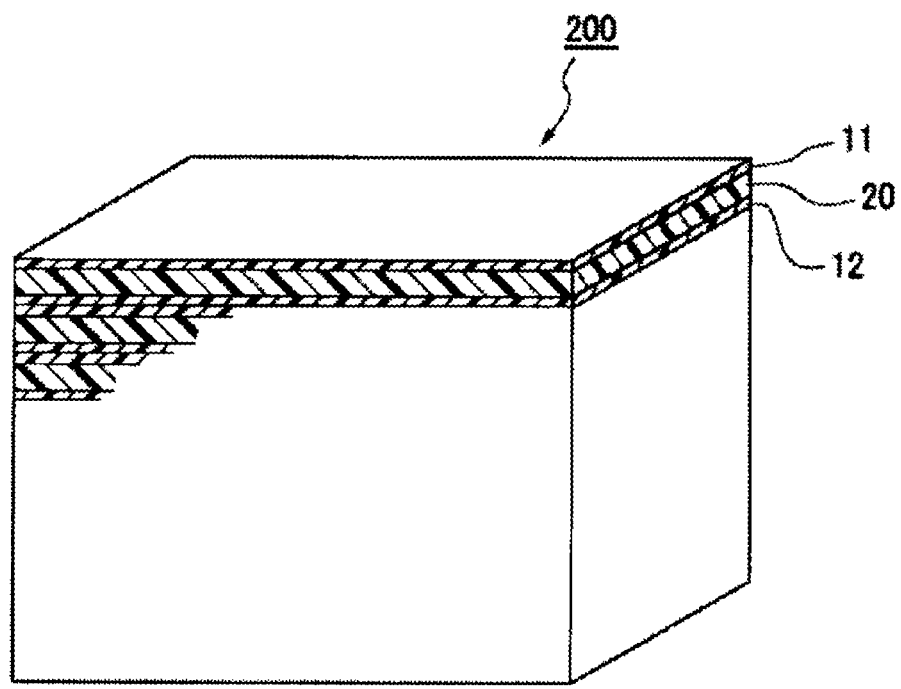
FIG. 2 is a schematic view of one configuration example of an adhesive article.

FIG. 2 shows another configuration example of the adhesive article according to this embodiment. The adhesive article 200 may be one obtained by stacking adhesive bodies 2, as shown in FIG. 2. In this case, outermost surfaces of the adhesive article 200 may be protected with a separator, etc., or the adhesive article 200 may be put in a case, etc.

In the case where the adhesive body is linear, this adhesive body may be a support-less (core-less) adhesive body constituted of a linear adhesive layer or may further include a core material.

Figure 3:
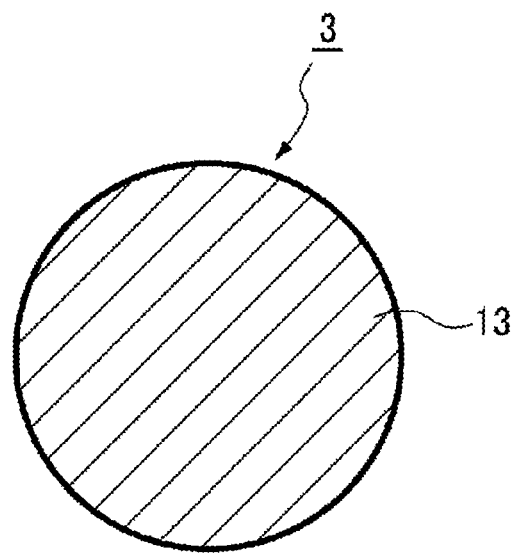
FIG. 3 is a schematic cross-sectional view of one configuration example of an adhesive body.

FIG. 3 is a schematic cross-sectional view of one configuration example of an adhesive body 3 according to the adhesive article according to this embodiment, taken along a direction perpendicular to the longitudinal direction of the adhesive body 3. The adhesive body 3 in this configuration example is a substrate-less adhesive body constituted of a linear adhesive layer 13. The term "linear" herein means a conception including not only the shape of a straight line, a curved line, an angular line, or the like but also the state of being bendable in various directions at various angles, like the state of a yarn (hereinafter referred to also as yarn-shaped). The term "adhesive layer" in this description means a conception including a linear adhesive body.

Although the cross-sectional shape of the adhesive article of this configuration example is circular, the cross-sectional shape of this embodiment is not limited thereto and can be an elliptic shape, a rectangular shape, e.g., quadrilateral, etc., besides being circular.

Figure 4:
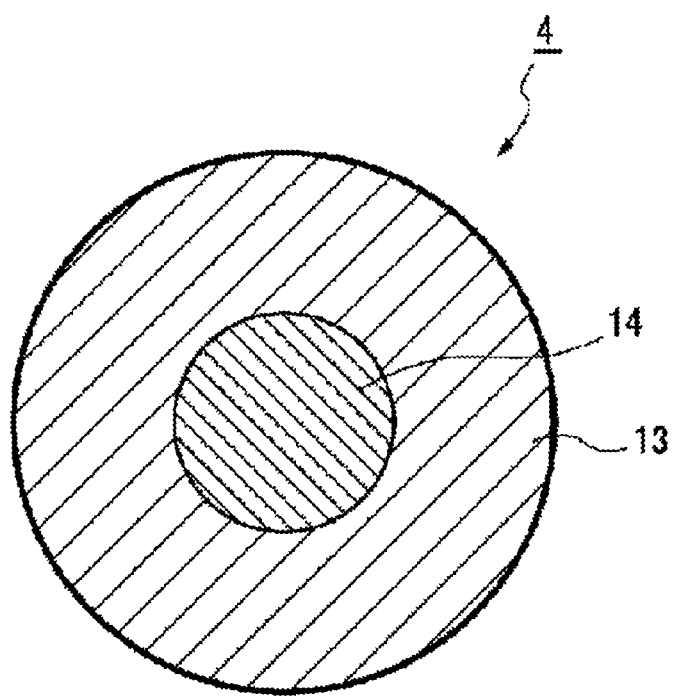
FIG. 4 is a schematic cross-sectional view of one configuration example of an adhesive body.

FIG. 4 is a schematic cross-sectional view of one configuration example of an adhesive body according to this embodiment, taken along a direction perpendicular to the longitudinal direction of the adhesive article. The adhesive body 4 shown in FIG. 4 includes a linear core material 14 and an adhesive layer 13 which covers the longitudinal-direction surface of the core material 14.

Although the cross-sectional shape of the adhesive body 4 of this configuration example is circular, the cross-sectional shape of this embodiment is not limited thereto and can be an elliptic shape, a rectangular shape, e.g., quadrilateral, etc., besides being circular.

Figure 5:
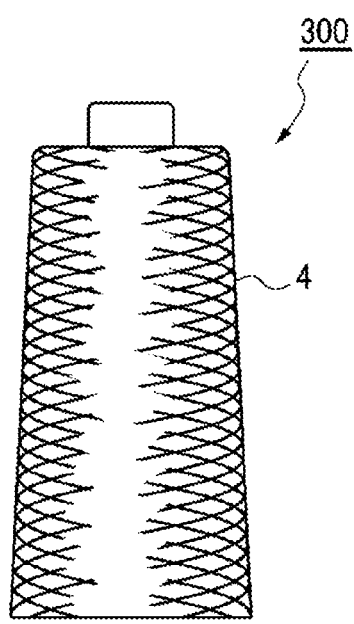
FIG. 5 is a schematic view of one configuration example of an adhesive article.

FIG. 5 shows another configuration example of the adhesive article according to this embodiment. The adhesive article 300 may be one obtained by winding an adhesive body 4 around a core, as shown in FIG. 5. In this case, an outermost surface of the adhesive article 300 may be protected with a separator, etc., or the adhesive article 300 may be put in a case, etc.

It is preferable that an adhesive article according to an embodiment of the present invention is an adhesive article including an adhesive body including an adhesive layer, wherein the adhesive layer has a gel content of 5-70%, the adhesive article, through 7-day storage at 40° C., has a change in the gel content of the adhesive layer of −5% to 5%, and surface portions of the adhesive layer are in contact with each other.

[Gel Content of Adhesive Layer]

The gel content of the adhesive layer of the adhesive body included in an adhesive article according to an embodiment of the present invention is 5% or higher, preferably 10% or higher, more preferably 20% or higher, in terms of % by weight from the standpoint of ensuring necessary cohesive force. Meanwhile, from the standpoint of imparting a sufficient force of adhesion to adherends, the gel content of the adhesive layer is 70% or less, preferably 65% or less, more preferably 55% or less, still more preferably 50% or less, especially preferably 45% or less.

The term "gel content of the adhesive layer" herein means a value determined by the following method. The gel content can be grasped as the proportion by weight of ethyl-acetate insolubles to the adhesive layer.

[Method for Determining Gel Content]

About 0.1 g of an adhesive sample (weight, W1) is wrapped in a porous polytetrafluoroethylene film having an average pore diameter of 0.2 μm (weight, W2) to form a purse-shaped package, and the mouth thereof is fastened with a kite string (weight, W3). As the porous polytetrafluoroethylene (PTFE) film, use is made of either trade name "NITOFLON (registered trademark) NTF1122" (average pore diameter, 0.2 μm; porosity, 75%; thickness, 85 μm), available from Nitto Denko Corp., or a product corresponding thereto.

This package is immersed in 50 mL of ethyl acetate and held at room temperature (typically 23° C.) for 7 days to dissolve out only a sol component of the adhesive layer through the film. Thereafter, the package is taken out and the ethyl acetate adherent to the outer surface thereof is wiped off. This package is dried at 130° C. for 1 hour, and the weight (W4) of the package is measured. The gel content of the adhesive layer can be determined by substituting the values into the following equation (1). The same method is used in the Examples which will be given layer.

$$\text{Gel content (\%)} = [(W4-W2-W3)/W1] \times 100 \quad (1)$$

[Change in Gel Content]

The adhesive article according to an embodiment of the present invention has a change in the gel content of the adhesive layer, through 7-day storage at 40° C., of −5% to 5%.

The change in the gel content can be determined by determining the gel content (F1) of the adhesive layer of the adhesive article and the gel content (F2) of the adhesive layer of the adhesive article which has been stored at 40° C. for 7 days and substituting the values of F1 and F2 into the following equation (2). The same method is used in the Examples which will be given later. The gel contents can be determined by the method shown above.

$$\text{Change in gel content (\%)} = F2 - F1 \quad (2)$$

Since the adhesive article according to this embodiment has a change in the gel content of the adhesive layer of −5% to 5%, this adhesive article produces an effect wherein surface portions of the adhesive layer which have been in contact with each other can be easily separated from each other. This is presumed to be because even in cases when surface portions of the adhesive layer are in contact with each other, a chemical reaction is less apt to occur between the portions of the adhesive layer and bonds such as chemical bonds are less apt to be formed. Because of this, even in cases when the adhesive article is in a form obtained by winding the adhesive body into a roll without using a separator or is in a form obtained by stacking a plurality of layers of the adhesive body without using a separator, the adhesive layers can be separated at the interface therebetween without destroying the shape of the adhesive body. Moreover, the adhesive body can be rewound or restacked without suffering a decrease in adhesive force.

The absolute value of the change in gel content is 5% or less, preferably 4% or less, from the standpoint of enabling rewinding or restacking.

By regulating the gel content and the change in gel content so as to be within those ranges, the adhesive layer can be inhibited over time from changing in the force of self-adhesion (self-adhesive force) in cases when surface portions of the adhesive layer are in contact with each other, and can be made to exhibit high adhesive force and holding power in application to adherends.

The adhesive force of the adhesive layer, as measured in a 180-degree peel test of the adhesive article which is sheet-shaped, is preferably 5 N/20 mm or higher, more preferably 6 N/20 mm or higher, still more preferably 7 N/20 mm or higher. Although there is no particular upper limit on the adhesive force, the adhesive force of the adhesive layer is preferably 100 N/20 mm or less, more preferably 80 N/20 mm or less, still more preferably 60 N/20 mm or less.

A preferred method for regulating the gel content is to give a crosslinking treatment to the adhesive composition constituting the adhesive. From the standpoint of regulating the change in gel content to a value within that range, it is preferred to cause crosslinking to proceed speedily, for example, by conducting the crosslinking using an appropriate crosslinking agent or performing radiation crosslinking, e.g., UV crosslinking or electron-beam crosslinking. As the crosslinking agent, it is preferred to use, for example, an organic peroxide, epoxy compound, amino-group-containing compound, organometallic salt, metal alcoholate, metal chelate, hydrazide compound, carbodiimide crosslinking agent, isocyanate crosslinking agent, or silane or silanol crosslinking agent in any desired amount.

[Adhesive Body]

In the adhesive article according to this embodiment, the adhesive body includes an adhesive layer. The adhesive layer is constituted of an adhesive formed from an adhesive composition. The adhesive is not particularly limited so long as it satisfies the gel content and the change in gel content, and known adhesives can be used. Examples thereof include acrylic adhesives, rubber-based adhesives, vinyl-alkyl-ether-based adhesives, silicone-based adhesives, polyester-based adhesives, polyamide-based adhesives, urethane-based adhesives, fluorochemical adhesives, and epoxy-based adhesives. Preferred of these from the standpoint of adhesiveness are acrylic adhesives, urethane-based adhesives, silicone-based adhesives, rubber-based adhesives, and polyester-based adhesives. Especially preferred are acrylic adhesives. One adhesive may be used alone, or two or more adhesives may be used in combination. It is preferable that the adhesive in this embodiment is a pressure-sensitive adhesive which has adhesiveness at ordinary temperature and which, when a surface thereof is brought into contact with a surface of an adherend, enables the adherend to be adhered to the adhesive surface by the pressure applied for the contact. In cases when the adhesive is a pressure-sensitive adhesive, the adhesive article requires no heating and is applicable even to adherends having poor heat resistance.

As the adhesive, use can be made of either a solvent-based adhesive or an aqueous-dispersion type adhesive. Preferred is an adhesive composition in which crosslinking proceeds as the adhesive composition dries (the solvent volatilizes) and the crosslinking speedily becomes completed after the drying. This is for preventing the adhesive layer from newly having additional crosslinks after surface portions of the adhesive layer have come into contact with each other. From the standpoint of using an adhesive which can be applied at a high speed, is friendly to the environment, and is reduced in influences of the solvent on the substrate and the core material (swelling, dissolution), aqueous-dispersion type adhesives are preferred and aqueous dispersion type acrylic adhesives are more preferred.

The term "acrylic adhesive" herein means an adhesive which includes an acrylic polymer as a base polymer (a main component among polymeric components; that is, a component which accounts for at least 50% by weight thereof). The term "acrylic polymer" means a polymer formed from one or more constituent monomers including a monomer having at least one (meth)acryloyl group in the molecule (hereinafter this monomer is sometimes referred to as "acrylic monomer") as a main component of the constituent monomers (a main component of the monomers; that is, a component which accounts for more than 50% by weight of the sum of the monomers for constituting the acrylic polymer). The term "(meth)acryloyl" in this description inclusively means acryloyl and methacryloyl. Likewise, the term "(meth)acrylic ester" inclusively means acrylic ester and methacrylic ester, and the term "(meth)acrylic" inclusively means acrylic and methacrylic.

The acrylic polymer is preferably a product of polymerization of starting-material monomers which include a (meth)acrylic acid alkyl ester as a main monomer and can further include minor monomers copolymerizable with the main monomer. The term "main monomer" means a component of the starting-material monomers which accounts for more than 50% by weight of the monomer composition.

Examples of (meth)acrylic acid alkyl ester include compounds represented by general formula (3).

$$CH_2=C(R^1)COOR^2 \quad (3)$$

(In the formula, $R^1$ represents a hydrogen atom or a method group, and $R^2$ represents an alkyl group having 2-14 carbon atoms.)

Examples of the $R^2$ include ethyl, propyl, isopropyl, butyl, isobutyl, isoamyl, hexyl, heptyl, 2-ethylhexyl, isooctyl, isononyl, and isodecyl. Preferred examples of $R^2$ among these are alkyl groups having 2-10 carbon atoms such as butyl and 2-ethylhexyl. One of such (meth)acrylic acid alkyl esters can be used along, or a mixture of two or more thereof can be used.

In the monomer mixture including a (meth)acrylic acid alkyl ester as a main component, the proportion of the (meth)acrylic acid alkyl ester [e.g., the (meth)acrylic acid $C_{2-14}$-alkyl ester] is generally 80% by weight or higher (e.g., about 80-99.8% by weight), preferably 85% by weight or higher (e.g., about 85-99.5% by weight), more preferably 90% by weight or higher (e.g., about 90-99% by weight).

The monomer mixture usually contains a functional-group-containing monomer (monomer containing a thermally crosslinkable functional group) for introducing crosslinking sites for thermal crosslinking. By using the functional-group-containing monomer as a comonomer component, the force of adhesion to adherends is also improved.

Examples of the functional-group-containing monomer include: carboxyl-group-containing monomers and acid anhydrides thereof, such as acrylic acid, methacrylic acid, itaconic acid, maleic acid, crotonic acid, and maleic anhydride; hydroxyl-group-containing monomers such as 2-hydroxyethyl (meth)acrylate, 2-hydroxypropyl (meth)acrylate, and 2-hydroxybutyl (meth)acrylate; amide-group-containing monomers such as (meth)acrylamide, N,N-dimethyl (meth)acrylamide, N-methylol(meth)acrylamide, N-methoxymethyl(meth)acrylamide, and N-butoxymethyl (meth)acrylamide; amino-group-containing monomers such as dimethylaminoethyl (meth)acrylate and t-butylaminoethyl (meth)acrylate; glycidyl-group-containing monomers such as glycidyl (meth)acrylate; and other monomers including (meth)acrylonitrile, N-(meth)acryloylmorpholine, and N-vinyl-2-pyrrolidone. Preferred of these are carboxyl-group-containing monomers including acrylic acid and the acid anhydrides thereof. One or more of such functional-group-containing monomers can be used.

The amount of the functional-group-containing monomer to be used is, for example, about 0.5-12 parts by weight, preferably about 1-8 parts by weight, per 100 parts by weight of the (meth)acrylic acid alkyl ester.

The monomer mixture may contain other copolymerizable monomers for enhancing properties, e.g., cohesive force, according to need. Examples of the copolymerizable monomers include: vinyl esters such as methyl (meth)acrylate and vinyl acetate; aromatic vinyl compounds such as styrene and vinyltoluene; (meth)acrylic esters of cyclic alcohols, such as cyclopentyl di(meth)acrylate and isobornyl (meth)acrylate; and (meth)acrylic esters of polyhydric alcohols, such as neopentyl glycol di(meth)acrylate, hexanediol di(meth)acrylate, propylene glycol di(meth)acrylate, trimethylolpropane tri(meth)acrylate, tetramethylolmethane tri (meth)acrylate, and dipentaerythritol hexa(meth)acrylate. One or more of these copolymerizable monomers can be used.

It is preferred to incorporate a crosslinking agent into these acrylic adhesives. As the crosslinking agent for the acrylic adhesives, crosslinking agents in common use can be employed. Examples thereof include silane crosslinking agents, organic peroxides, epoxy compounds, amino-group-containing compounds, organometallic salts, metal alcoholates, metal chelates, hydrazide crosslinking agents, carbodiimide crosslinking agents, isocyanate crosslinking agents, and silanol crosslinking agents. Preferred of these are organometallic salts, metal chelates, hydrazide crosslinking agents, and silane crosslinking agents, because it is easy, with these crosslinking agents, to regulate the change in the gel content of the adhesive layer to a value within the range shown above. In the case of aqueous-dispersion type adhesives, hydrazide crosslinking agents and silane crosslinking agents are especially more preferred. The crosslinking agents may be either oil-soluble or water-soluble. One crosslinking agent may be used alone, or two or more crosslinking agents may be used in combination.

As the silane crosslinking agents, it is preferred to use silane monomers copolymerizable with the (meth)acrylic acid alkyl ester. The silane monomers are not particularly limited so long as the monomers are silicon-atom-containing polymerizable compounds. However, silane compounds having a (meth)acryloyl group, such as, for example, (meth)acryloyloxyalkylsilane derivatives, are preferred because these compounds have excellent copolymerizability with the (meth)acrylic acid alkyl ester. Examples of the silane monomers include γ-methacryloxypropyltrimethoxysilane, 3-acryloyloxypropyltrimethoxysilane, 3-methacryloyloxypropyltriethoxysilane, 3-acryloyloxypropyltriethoxysilane, 3-methacryloyloxypropylmethyldimethoxysilane, 3-acryloyloxypropylmethyldimethoxysilane, 3-methacryloyloxypropylmethyldiethoxysilane, and 3-acryloyloxypropylmethyldiethoxysilane. One of these silane monomers can be used alone, or two or more thereof can be used in combination.

Other usable copolymerizable silane monomers include, for example, vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloyloxydecyltrimethoxysilane, 10-acryloyloxydecyltrimethoxysilane, 10-methacryloyloxydecyltriethoxysilane, and 10-acryloyloxydecyltriethoxysilane.

The amount of the crosslinking agent to be used can be suitably selected in accordance with the kinds of the starting-material monomers, use of the adhesive article, etc. The crosslinking agent can be used in such an amount as to result in an adhesive layer having a gel content and a change in gel content which are within the desired ranges. In the present invention, the amount of the crosslinking agent per 100 parts by weight of the starting-material monomers (excluding the crosslinking agent) is in the range of preferably 0.005-5 parts by weight, more preferably 0.01-3 parts by weight.

Other crosslinking may be employed in the present invention, and use can be made, for example, of crosslinking with another crosslinking agent or radiation crosslinking such as UV crosslinking or electron-beam crosslinking. As said another crosslinking agent, crosslinking agents in common use can be employed. Examples thereof include organic peroxides, epoxy compounds, amino-group-containing compounds, organometallic salts, metal alcoholates, metal chelates, hydrazide crosslinking agents, carbodiimide crosslinking agents, isocyanate crosslinking agents, and silane or silanol crosslinking agents. Said another crosslinking agent may be either oil-soluble or water-soluble.

The adhesive layer can be formed using an adhesive composition, and the adhesive composition is preferably an aqueous-dispersion type adhesive composition.

The aqueous-dispersion type adhesive composition can be prepared, for example, by subjecting a monomer mixture including the (meth)acrylic acid alkyl ester as a main component and containing a silane monomer to ordinary emulsion polymerization to obtain an aqueous dispersion of a (meth)acrylic ester copolymer and adding said another crosslinking agent thereto according to need.

The reason why use of the aqueous-dispersion type adhesive composition including the (meth)acrylic acid alkyl ester as a main component and containing a silane monomer produces an excellent effect has not been entirely elucidated. However, the intramolecular chains each connecting a crosslinked site to another crosslinked site in the polymer molecule are long, rendering the polymer chains less apt to become loose. In addition, since no water is present after drying, the polymer does not hydrolyze. Even when portions of the adhesive layer of the adhesive body come into contact with each other, neither a condensation reaction nor a crosslinking reaction proceeds. Hence, a reaction is less apt to occur between the portions of the adhesive layer and self-adhesion is less apt to occur. It is therefore presumed that even in cases when the adhesive body is wound into a roll without interposing a separator or a plurality of layers of the adhesive body are stacked without interposing a separator, resulting in a state in which the adhesive layer is in contact with itself, then the adhesive layer can be more easily separated at the interface.

Usable polymerization methods include common batch polymerization, continuous dropping polymerization, portion-wise dropping polymerization, etc. The polymerization temperature is, for example, about 20-100° C.

Examples of polymerization initiators usable in the polymerization include: azo initiators such as 2,2'-azobis[N-(2-carboxyethyl)-2-methylpropionamide] n-hydrate, 2,2'-azobisisobutyronitrile, 2,2'-azobis(2-methylpropionamidine) disulfate, 2,2'-azobis(2-amidinopropane) dihydrochloride, 2,2'-azobis[2-(5-methyl-2-imidazolin-2-yl)propane] dihydrochloride, and 2,2'-azobis(N,N'-dimethyleneisobutylamidine); persulfates such as potassium persulfate and ammonium persulfate; peroxide initiators such as benzoyl peroxide, t-butyl hydroperoxide, and hydrogen peroxide; substituted-ethane initiators such as phenyl-substituted ethane; aromatic carbonyl compounds; and redox initiators such as combinations of a persulfate with sodium hydrogen sulfite and combinations of a peroxide with sodium ascorbate. However, usable polymerization initiators are not limited to these. The amount of the polymerization initiator to be used is, for example, about 0.005-1 part by weight per 100 parts by weight of the sum of the monomers.

A chain transfer agent may be used in the polymerization. Examples of the chain transfer agent include common chain transfer agents including, for example, mercaptans such as lauryl mercaptan and dodecanethiol. The amount of the chain transfer agent to be used is, for example, about 0.001-0.5 parts by weight per 100 parts by weight of the sum of the monomers.

Usable emulsifying agents include: anionic emulsifying agents such as sodium lauryl sulfate, sodium polyoxyethylene lauryl sulfate, ammonium lauryl sulfate, sodium dodecylbenzenesulfate, sodium polyoxyethylene alkyl ether sulfates, ammonium polyoxyethylene alkylphenyl ether sulfates, and sodium polyoxyethylene alkylphenyl ether sulfates; and nonionic surfactants such as polyoxyethylene alkyl ethers and polyoxyethylene alkylphenyl ethers. One of these emulsifying agents may be used alone, or two or more thereof may be used in combination. The amount of the emulsifying agent to be used is, for example, about 0.2-10 parts by weight, preferably about 0.5-5 parts by weight, per 100 parts by weight of the sum of the monomers.

Besides being obtainable by the method described above, the adhesive composition may be prepared by obtaining the (meth)acrylic ester copolymer by a method other than emulsion polymerization, thereafter adding the crosslinking agent thereto according to need, and dispersing the polymer in water with an emulsifying agent.

According to need, a base (e.g., ammonia water) or acid for pH regulation and additives for common use in adhesives, such as, for example, a tackifier resin, thickener, surfactant, aging inhibitor, filler, pigment, and colorant, may have been further added to the adhesive composition.

As the tackifier resin, use can be made of one or more resins selected from various tackifier resins including rosin-based resins, rosin derivative resins, petroleum resins, terpene-based resins, phenolic resins, and ketone-based resins.

The content of the tackifier resin, per 100 parts by weight of the base polymer, is preferably 60 parts by weight or less, more preferably 50 parts by weight or less, still more preferably 40 parts by weight or less, yet still more preferably 30 parts by weight or less.

Examples of the thickener include poly(acrylic acid)-based thickeners, urethane-based thickeners, and poly(vinyl alcohol)-based thickeners. Preferred of these are poly(acrylic acid)-based thickeners and urethane-based thickeners. The content of the thickener is preferably 10 parts by weight or less, more preferably 5 parts by weight or less, per 100 parts by weight of the base polymer.

Methods for forming the adhesive body according to this embodiment are not particularly limited. For example, use can be made of: a method (direct method) in which the adhesive composition is directly applied to a releasing or non-releasing substrate and then dried or cured to form an adhesive layer; or a method (transfer method) in which the adhesive composition is applied to a surface having release properties and then dried or cured to thereby form an adhesive layer on the surface and this adhesive layer is thereafter applied and transferred to a substrate.

In the case of an adhesive body which is sheet-shaped, the sheet-shaped adhesive body (adhesive sheet) can be obtained, for example, by applying the adhesive composition to a substrate and thermally crosslinking the applied adhesive composition to form an adhesive layer. Meanwhile, an adhesive sheet having no substrate can be obtained by forming the adhesive layer on a separator.

The adhesive sheet may be an adhesive tape. From the standpoints of strength and handleability, the width of the adhesive tape is preferably 0.01 mm or larger, more preferably 0.02 mm or larger. From the standpoint of enabling the obtained adhesive body to be applicable to adherends having various surface shapes or regions, the width of the adhesive tape is preferably 40 mm or less, more preferably 20 mm or less.

In the case of the adhesive body (adhesive layer) having no substrate, the thickness thereof is not particularly limited. However, since too small thicknesses may result in poor handleability, the thickness thereof is, for example, preferably 1 μm or larger, more preferably 5 μm or larger. Meanwhile, since too large thicknesses may result in poor flexibility, the thickness thereof is, for example, preferably 100 μm or less, more preferably 50 μm or less.

In the case of an adhesive body having a substrate, the substrate is preferably one which satisfies that the force of adhesion between the adhesive layer and the substrate is higher than the self-adhesive force in the adhesion of the adhesive layer to itself, from the standpoint of maintaining the shape of the adhesive body. For example, use can be made of plastic films such as polypropylene films, ethylene/propylene copolymer films, polyester films, and poly(vinyl chloride), paper including kraft paper, metal foils, and the like. The plastic films may be either unstretched films or stretched (uniaxially or biaxially stretched) films. That surface of the substrate to which the adhesive composition is to be applied may have undergone a surface treatment with an ordinary primer, a corona discharge, etc. The thickness of the substrate is generally about 10-500 μm, although it can be suitably selected in accordance with purposes.

The thickness of the adhesive layer in this case is not particularly limited and can be suitably selected in accordance with purposes. Usually, an appropriate range of the thickness of the adhesive layer is about 1-200 μm, and the thickness thereof is preferably about 3-150 μm.

The adhesive composition can be applied using a common coater such as, for example, a gravure roll coater, reverse-roll coater, kiss-roll coater, dip-roll coater, bar coater, knife coater, or spray coater. The adhesive composition is applied so as to give an adhesive layer which, after having been dried, has a thickness of, for example, about 10-100 μm. A drying temperature can be suitably employed, but is preferably 40-200° C., more preferably 50-180° C., especially preferably 70-120° C. An appropriate drying time can be suitably employed. The drying time is preferably 5 seconds to 20 minutes, more preferably 5 seconds to 10 minutes, especially preferably 10 seconds to 5 minutes.

Thermal crosslinking is conducted by an ordinary method, for example, by heating the applied adhesive composition to a temperature at which the crosslinking reaction proceeds, in accordance with the kind of the crosslinking agent. After the crosslinking, the adhesive layer has a solvent-insoluble content of, for example, about 5-70% by weight. The solvent-soluble components of the crosslinked adhesive layer have a molecular weight (weight-average molecular weight; calculated for standard polystyrene) of, for example, about 100,000 to 600,000, preferably about 200,000 to 450,000. The molecular weights of the solvent insolubles and solvent-soluble components of the crosslinked adhesive layer can be set at any desired values, for example, by suitably regulating the proportion of the crosslinking agent or a functional-group-containing monomer to the total amount of the monomers and the kind and amount of the chain transfer agent, in particular, the amounts of the crosslinking agent and chain transfer agent.

In the case of an adhesive body which is linear, this linear adhesive body can be obtained, for example, by the following methods.

Methods for forming the linear adhesive body according to this embodiment are not particularly limited. For example, the adhesive body can be formed by preparing an adhesive composition for constituting the adhesive body and linearly applying the adhesive composition on a separator using a dispenser. In the case where the adhesive body is one including a core material and an adhesive layer, use can be made of a method in which an adhesive composition is applied to the surface of the core material by dipping, immersion, or another application method and then heating and drying the applied adhesive composition to thereby form an adhesive layer on the surface of the core material. The application of the adhesive composition can be conducted using a common coater such as, for example, a gravure roll coater, reverse-roll coater, kiss-roll coater, dip-roll coater, bar coater, knife coater, or spray coater. A drying temperature can be suitably employed, but is preferably 40-200° C., more preferably 50-180° C., especially preferably 70-120° C. An appropriate drying time can be suitably employed. The drying time is preferably 5 seconds to 20 minutes, more preferably 5 seconds to 10 minutes, especially preferably 10 seconds to 5 minutes.

In the case of a linear adhesive body having no core material and having a circular cross-sectional shape, the diameter of the cross-section of the adhesive body is not particularly limited. However, since the linear adhesive body having too small a diameter may be prone to break, the diameter thereof is, for example, preferably 20 µm or larger, more preferably 50 µm or larger. Meanwhile, since the linear adhesive body having too large a diameter may have poor flexibility, the diameter thereof is, for example, preferably 1,000 µm or less, more preferably 500 µm or less.

In the case where the adhesive body is a linear adhesive body including a core material, the adhesive layer may cover the whole surface (longitudinal-direction surface) of the core material or may cover only some of the core-material surface. Typically, the adhesive layer is continuous. However, the disposition of the adhesive layer is not limited thereto, and the adhesive layer may have been formed in accordance with a regular or random pattern, e.g., a dotted or striped pattern. The end surfaces of the core material may be or may not be covered with the adhesive layer. In cases when the adhesive article is cut during the production thereof or when used, the end surface of the core material can remain not covered with the adhesive layer.

The core material to be used in the adhesive body is not particularly limited. For example, use can be made of resins, rubbers, foamed objects, inorganic fibers, composites of these, etc. From the standpoint of maintaining the shape of the adhesive body, the core material is preferably one which satisfies that the force of adhesion between the adhesive layer and the core material is higher than the self-adhesive force in the adhesion of the adhesive layer to itself. Examples of the resins include polyolefins such as polyethylene (PE), polypropylene (PP), ethylene/propylene copolymers, and ethylene/vinyl acetate copolymers, polyesters such as poly(ethylene terephthalate) (PET), vinyl chloride resins, vinyl acetate resins, polyimide resins, polyamide resins, and fluororesins. Examples of the rubbers include natural rubber and synthetic rubbers, e.g., urethane rubbers. Examples of the foamed objects include foamed polyurethanes and foamed polychloroprene rubber. Examples of the fibers include glass fibers, carbon fibers, and metal fibers. The core material is not particularly limited in the cross-sectional shape thereof, but usually has a cross-sectional shape according to the cross-sectional shape of the adhesive article.

Yarn-shaped core materials usable in the yarn-shaped adhesive body are not particularly limited in the material thereof, and may be chemical fibers or natural fibers. Examples of the chemical fibers include various polymeric materials such as rayon, cupra, acetate, promix, nylon, aramid, vinylon, vinylidene, poly(vinyl chloride), polyesters, acrylics, polyethylene, polypropylene, polyurethanes, polychlal, and poly(lactic acid), glasses, carbon fibers, synthetic rubbers, e.g., polyurethanes, and metals. Examples of the natural fibers include silk, natural rubber, cotton, and wool.

With respect to forms of the yarn-shaped core material, use can be made of, for example, monofilament yarns, multifilament yarns, spun yarns, finished yarns which are generally called textured yarns, bulky yarns, or stretch yarns and which have undergone crimping, bulking, etc., or yarns each obtained by combining these yarns by twisting, etc. The cross-sectional shape thereof is not limited to circular ones, and can be a quadrilateral shape, a short shape, e.g., a star shape, an elliptic shape, a hollow shape, etc.

Various additives including a filler (inorganic filler, organic filler, etc.), aging inhibitor, antioxidant, ultraviolet absorber, antistatic agent, lubricant, plasticizer, and colorant (pigment, dye, etc.) may have been incorporated into the core material according to need. The surface of the core material may have undergone a known or common surface treatment such as, for example, a corona discharge treatment, plasma treatment, or coating with a primer.

The size of the cross-section of the core material is not particularly limited and can be suitably selected in accordance with purposes. For example, in the case of a circular cross-sectional shape, the diameter thereof is preferably 1-2,000 µm, more preferably 10-1,000 µm, from the standpoint of handleability (unsusceptibility to breakage).

In the case of the adhesive body including a core material, the thickness of the adhesive layer is not particularly limited. From the standpoint of adhesiveness, however, the thickness thereof is, for example, preferably 1 µm or larger, more preferably 3 µm or larger. From the standpoint of drying property, the thickness thereof is, for example, preferably 200 µm or less, more preferably 150 µm or less.

The adhesive article according to this embodiment is advantageous in that since the adhesive body is linear, the adhesive article can be applied even to narrow members or narrow regions while being inhibited from protruding and renders easy disassembly (reworking) possible. For example, the adhesive article according to this embodiment is suitable for fixing components, etc. in producing electronic appliances and is usable also for fixing the narrow frames of personal digital assistants such as cell phones and smartphones.

In addition, since the adhesive body is linear, the adhesive article according to this embodiment can be pushed into narrow gaps to adhere to surfaces in the gaps or fill the gaps.

The adhesive article according to this embodiment preferably has flexibility, and is especially preferably yarn-shaped so that the adhesive article can be bent in various directions at various angles like yarns. The adhesive article having flexibility, in particular the yarn-shaped adhesive article, has an advantage in that this adhesive article is easy to be applied to complicated shapes such as curved lines, curved surfaces, and rugged surfaces, besides having the effects shown above.

For example, in cases when an adhesive tape is applied to an adherend having a portion with a complicated shape, such as a curved line, curved surface, or rugged surface, the adhesive tape undesirably has rumples or overlaps in the area overlying that portion and it is difficult to beautifully apply the adhesive tape while inhibiting protrusion. The portion where rumples or overlaps have occurred may cause a decrease in adhesive force. Although it is thought that the adhesive tape can be applied without forming rumples or overlaps if the adhesive tape is applied while being finely cut, this results in a considerable decrease in application efficiency. Meanwhile, the adhesive article having flexibility, in particular the yarn-shaped adhesive article, can be tenaciously applied, without forming rumples or overlaps, even to portions having a complicated shape such as a curved line, curved surface, or rugged surface. Furthermore, since this adhesive article can be applied to a desired adherend portion at a time, i.e., in one step, the adhesive article has excellent application efficiency and is usable in automated lines.

Specifically, examples of uses of the yarn-shaped adhesive article include applications in which various wire materials (linear members) and small-width members, such as, for example, cables, e.g., electrical wires and optical fibers, LED fiber lights, optical fiber sensors including FBGs (fiber Bragg gratings), yarns, strings, and wires, are fixed in desired forms. For example, even in cases when a wire material or a small-width member is to be fixed to another member so as to have a complicated shape, the yarn-shaped adhesive article can be applied with excellent application efficiency in accordance with the complicated shape required of the wire material or small-width member and tenaciously fix the wire material or small-width member while inhibiting protrusion and the occurrence of rumples or overlaps. In the case of fixing a wire material or a small-width member to another member, use can be made of a method in which the yarn-shaped adhesive article is applied beforehand to a surface portion of the other member in accordance with the form in which the wire material or small-width member is to be fixed and, thereafter, the wire material or small-width member is adhered to the adhesive article applied to the surface of the other member and is thus fixed. Alternatively, the yarn-shaped adhesive article may be applied to the wire material or small-width member before the wire material or small-width member is fixed in a desired form to another member.

Moreover, the yarn-shaped adhesive article is suitable also for use in temporary fixing (temporary tacking) applications in which an article is temporarily fixed (temporarily tacked) to a surface of another article. More specifically, the yarn-shaped adhesive article is especially suitable for use in temporary fixing (temporary tacking) applications in producing, for example, textile products, leather products, etc., such as garments, boots, shoes, bags, hats, caps, and the like. However, uses of the yarn-shaped adhesive article are not limited thereto and the yarn-shaped adhesive article is suitable for use in various applications where temporary fixing (temporary tacking) is desired.

For example, in cases when one article is to be fixed to a surface of another article, use may be made of a method in which said one article is temporarily fixed to the surface of said another article and positioned using the yarn-shaped adhesive article and, thereafter, the two articles are fixed (finally fixed) by a fixing method, e.g., thermal press bonding or sewing. In this case, with the yarn-shaped adhesive article, it is easy to temporarily fix said one article while avoiding a fixing part disposed between the two articles. For example, in the case of producing a textile product or a leather product by sewing, it is easy, with the yarn-shaped adhesive article, to conduct temporarily fixing while avoiding portions to be sewn. Thus, the needle can be easily prevented from suffering adhesive adhesion thereto.

Furthermore, the yarn-shaped adhesive article can be satisfactorily applied even in cases when the two articles have complicated shapes including a curved line, curved surface, rugged surface, etc., while inhibiting protrusion and the occurrence of rumples or overlaps, as stated above. In addition, the yarn-shaped adhesive article can be applied in one step to show satisfactory application efficiency.

Even in the case where, for example, a member which is apt to deform, such as a cloth, fabric, or leather, is used for constituting a textile or leather product, temporary fixing with the yarn-shaped adhesive article can inhibit or prevent the member from suffering a deformation due to tension, resulting in satisfactory design attractiveness after fixing (final fixing).

Moreover, in cases when the yarn-shaped adhesive article is used, it is easy to draw out and remove the yarn-shaped adhesive article from between the fixed (finally fixed) articles according to need after the fixing (final fixing) of the two articles. Thus, adhesive protrusion can be prevented and a deterioration in design attractiveness due to the discoloration with time of any residual adhesive can be satisfactorily prevented.

In addition, the yarn-shaped adhesive article can be twisted with a filament of another material to obtain a combined yarn or can be knitted together with a yarn of another material or with a fabric (including a nonwoven fabric or sheet). Thus, combined functions can be obtained.

EXAMPLES

The present invention is described below in detail by reference to Examples, but the invention is not limited to the following Examples in any way.

Example 1

(Preparation of Aqueous-Dispersion Type Acrylic Adhesive Composition A for Adhesive-Layer Formation)

Forty parts by weight of ion-exchanged water was introduced into a reaction vessel equipped with a condenser tube, a nitrogen introduction pipe, a thermometer, and a stirrer. The contents were stirred at 60° C. for 1 hour or longer while introducing nitrogen gas, thereby conducting nitrogen displacement. Into this reaction vessel was introduced 0.1 part of 2,2'-azobis[N-(2-carboxyethyl)-2-methylpropionamidine] n-hydrate (polymerization initiator). Monomer emulsion A was gradually added dropwise thereto over 4 hours while keeping the system at 60° C., thereby allowing an emulsion polymerization reaction to proceed.

The monomer emulsion A was one obtained by adding 98 parts by weight of 2-ethylhexyl acrylate, 1.25 parts by weight of acrylic acid, 0.75 parts by weight of methacrylic acid, 0.05 parts by weight of lauryl mercaptan (chain transfer agent), 0.02 parts by weight of γ-methacryloxypropyltrimethoxysilane (trade name "KBM-503", manufactured by Shin-Etsu Chemical Co., Ltd.), and 2 parts by weight of sodium polyoxyethylene lauryl sulfate (emulsifying agent) to 30 parts by weight of ion-exchanged water and emulsifying the mixture. After completion of the dropwise addition of the monomer emulsion A, the system was kept at 60° C. for further 3 hours and then cooled to room temperature. Thereafter, the pH of the resultant mixture was adjusted to 7 by adding 10 wt % ammonia water. Thus, an acrylic polymer emulsion (aqueous-dispersion type acrylic polymer) A was obtained.

A tackifier resin emulsion (an aqueous emulsion of a polymerized rosin ester having a softening point of 160° C.; trade mane "E-865NT", manufactured by Arakawa Chemical Industries, Ltd.) was added to the aqueous-dispersion type acrylic polymer A in an amount of 20 parts by weight on a solid basis per 100 parts by weight of the acrylic polymer contained in the aqueous dispersion A. Furthermore, the pH and viscosity of the mixture were regulated to 7.2 and 10 Pa·s, respectively, using 10 wt % ammonia water as a pH regulator and poly(acrylic acid) (trade name "ARON B-500", manufactured by Toagosei Co., Ltd.) as a thickener. Thus, an aqueous-dispersion type acrylic adhesive composition A for adhesive was obtained.

(Production of Sheet-Shaped Adhesive Article)

The aqueous-dispersion type acrylic adhesive composition A was applied with an applicator to a PET substrate having a size of 70 cm×25 cm and a thickness of 25 μm (trade name "LUMIRROR S10", manufactured by Toray Industries, Inc.) and then dried at 100° C. for 2 minutes to form an adhesive layer. The adhesive layer thus formed had a thickness of 25 μm. Thus, a sheet-shaped adhesive article (adhesive sheet) of Example 1 was produced.

(Production of Linear Adhesive Article)

A monofilament polyester yarn having a diameter of 300 μm (manufactured by UNIPLAS Corp.) was used as a core material. The aqueous-dispersion type acrylic adhesive composition A was applied to the core material by dipping in such an amount that the adhesive article to be obtained had an adhesive coating amount of 40 mg/m. Thereafter, the coated core material was dried at 95° C. for 2 minutes to form an adhesive layer. Thus, a linear adhesive article of Example 1 was obtained.

Example 2

A tackifier resin emulsion (an aqueous emulsion of a polymerized rosin ester having a softening point of 160° C.; trade mane "E-865NT", manufactured by Arakawa Chemical Industries, Ltd.) was added to the aqueous-dispersion type acrylic polymer A obtained in Example 1, in an amount of 30 parts by weight on a solid basis per 100 parts by weight of the acrylic polymer contained in the aqueous dispersion A. Furthermore, the pH and viscosity of the mixture were regulated to 7.2 and 10 Pa·s, respectively, using 10 wt % ammonia water as a pH regulator and poly(acrylic acid) (trade name "ARON B-500", manufactured by Toagosei Co., Ltd.) as a thickener. Thus, an aqueous-dispersion type acrylic adhesive composition B for adhesive was obtained.

A sheet-shaped adhesive article and a linear adhesive article were produced in the same manners as in Example 1, except that the aqueous-dispersion type acrylic adhesive composition B for adhesive-layer formation was used in place of the aqueous-dispersion type acrylic adhesive composition A. These adhesive articles were evaluated.

Example 3

A tackifier resin emulsion (an aqueous emulsion of a polymerized rosin ester having a softening point of 160° C.; trade mane "E-865NT", manufactured by Arakawa Chemical Industries, Ltd.) was added to the aqueous-dispersion type acrylic polymer A obtained in Example 1, in an amount of 70 parts by weight on a solid basis per 100 parts by weight of the acrylic polymer contained in the aqueous dispersion A. Furthermore, the pH and viscosity of the mixture were regulated to 7.2 and 10 Pa·s, respectively, using 10 wt % ammonia water as a pH regulator and poly(acrylic acid) (trade name "ARON B-500", manufactured by Toagosei Co., Ltd.) as a thickener. Thus, an aqueous-dispersion type acrylic adhesive composition C for adhesive was obtained.

A sheet-shaped adhesive article and a linear adhesive article were produced in the same manners as in Example 1, except that the aqueous-dispersion type acrylic adhesive composition C for adhesive-layer formation was used in place of the aqueous-dispersion type acrylic adhesive composition A. These adhesive articles were evaluated.

Example 4

Forty parts by weight of ion-exchanged water was introduced into a reaction vessel equipped with a condenser tube, a nitrogen introduction pipe, a thermometer, and a stirrer. The contents were stirred at 60° C. for 1 hour while introducing nitrogen gas. Into this reaction vessel was introduced 0.1 part of 2,2'-azobis[2-(5-methyl-2-imidazolin-2-yl) propane] dihydrochloride (polymerization initiator). Monomer emulsion B was gradually added dropwise thereto over 4 hours while keeping the system at 60° C., thereby allowing an emulsion polymerization reaction to proceed.

The monomer emulsion B was one obtained by adding 30 parts by weight of 2-ethylhexyl acrylate, 70 parts by weight of butyl acrylate, 3.0 parts by weight of acrylic acid, 0.05 parts by weight of n-lauryl mercaptan (chain transfer agent), 0.03 parts by weight of γ-methacryloxypropyltrimethoxysilane (trade name "KBM-503", manufactured by Shin-Etsu Chemical Co., Ltd.), and 2 parts by weight of sodium polyoxyethylene lauryl sulfate (emulsifying agent) to 30 parts by weight of ion-exchanged water and emulsifying the mixture.

After completion of the dropwise addition of the monomer emulsion B, the system was kept at 60° C. for further 3 hours. Subsequently, 0.2 parts by weight of 35% aqueous hydrogen peroxide solution and 0.6 parts by weight of ascorbic acid were added. The system was cooled to room temperature. Thereafter, the pH and viscosity of the mixture were regulated to 7.2 and 10 Pa·s, respectively, using 10% ammonium water and poly(acrylic acid) (trade name "ARON B-500", manufactured by Toagosei Co., Ltd.) as a thickener. Thus, an acrylic polymer emulsion (aqueous-dispersion type acrylic polymer) B for adhesive-layer formation was obtained.

A sheet-shaped adhesive article and a linear adhesive article were produced in the same manners as in Example 1, except that the aqueous-dispersion type acrylic polymer B was used in place of the aqueous-dispersion type acrylic adhesive composition A. These adhesive articles were evaluated.

Example 5

Into a three-necked flask were introduced 3 parts by weight of acrylic acid, 4 parts by weight of vinyl acetate, 93 parts by weight of butyl acrylate, and 200 parts by weight of toluene as a polymerization solvent. The contents were stirred for 2 hours while introducing nitrogen gas. Thereafter, 0.15 parts by weight of AIBN (2,2'-azobisisobutyronitrile) was added thereto, and the resultant mixture was heated to 70° C. to conduct a polymerization reaction for 6 hours to obtain a solution of an acrylic polymer A. Into this polymer solution were incorporated 30 parts by weight of a polymerized rosin (PENSEL D125, manufactured by Arakawa Chemical Industries, Ltd.) and 2.5 parts by weight of an isocyanate crosslinking agent (CORONATE L, manufactured by Nippon Polyurethane Co., Ltd.) per 100 parts by weight of the solid component of the polymer solution. Thus, an acrylic adhesive composition E for adhesive-layer formation was prepared.

(Production of Sheet-Shaped Adhesive Article)

The acrylic adhesive composition E was applied with an applicator to a PET substrate having a size of 70 cm×25 cm and a thickness of 25 μm (trade name "LUMIRROR S10", manufactured by Toray Industries, Inc.) and then dried at 100° C. for 2 minutes. Thereafter, the coated substrate was allowed to stand at room temperature (20° C.) for 24 hours to form an adhesive layer. The adhesive layer thus formed had a thickness of 25 μm. Thus, a sheet-shaped adhesive article (adhesive sheet) of Example 5 was produced.

(Production of Linear Adhesive Article)

A monofilament polyester yarn having a diameter of 300 μm (manufactured by UNIPLAS Corp.) was used as a core material. The acrylic adhesive composition E was applied to the core material by dipping in such an amount that the adhesive article to be obtained had an adhesive coating amount of 40 mg/m. Thereafter, the coated core material was dried at 95° C. for 2 minutes and then allowed to stand at room temperature (20° C.) for 24 hours to form an adhesive layer. Thus, a linear adhesive article of Example 5 was obtained.

Example 6

A sheet-shaped adhesive article and a linear adhesive article were produced in the same manners as in Example 4, except that the aqueous-dispersion type acrylic polymer A obtained in Example 1 was used in place of the aqueous-dispersion type acrylic polymer B. These adhesive articles were evaluated.

Comparative Example 1

A sheet-shaped adhesive article and a linear adhesive article were produced in the same manners as in Example 1, except that the aqueous-dispersion type acrylic adhesive composition A of Example 1 was replaced by the acrylic adhesive composition E. These adhesive articles were evaluated.

Comparative Example 2

An acrylic adhesive composition F was prepared and a sheet-shaped adhesive article (adhesive sheet) and a linear adhesive article of Comparative Example 2 were produced, in the same manners as in Comparative Example 1, except that the amount of the isocyanate crosslinking agent to be incorporated in Example 5 was changed to 5 parts by weight. These adhesive articles were evaluated.

Comparative Example 3

Forty parts by weight of ion-exchanged water was introduced into a reaction vessel equipped with a condenser tube, a nitrogen introduction pipe, a thermometer, and a stirrer. The contents were stirred at 60° C. for 1 hour or longer while introducing nitrogen gas, thereby conducting nitrogen displacement. Into this reaction vessel was introduced 0.1 part of 2,2'-azobis[N-(2-carboxyethyl)-2-methylpropionamidine] n-hydrate (polymerization initiator). Monomer emulsion C was gradually added dropwise thereto over 4 hours while keeping the system at 60° C., thereby allowing an emulsion polymerization reaction to proceed.

The monomer emulsion C was one obtained by adding 98 parts by weight of 2-ethylhexyl acrylate, 1.25 parts by weight of acrylic acid, 0.75 parts by weight of methacrylic acid, 0.05 parts by weight of lauryl mercaptan (chain transfer agent), and 2 parts by weight of sodium polyoxyethylene lauryl sulfate (emulsifying agent) to 30 parts by weight of ion-exchanged water and emulsifying the mixture.

After completion of the dropwise addition of the monomer emulsion C, the system was kept at 60° C. for further 3 hours and then cooled to room temperature. Thereafter, the pH of the resultant mixture was adjusted to 7 by adding 10 wt % ammonia water. Thus, an acrylic polymer emulsion (aqueous-dispersion type acrylic polymer) C for adhesive-layer formation was obtained.

A sheet-shaped adhesive article and a linear adhesive article were produced in the same manners as in Example 1, except that the aqueous-dispersion type acrylic adhesive composition C was used in place of the aqueous-dispersion type acrylic adhesive composition A of Example 1. These adhesive articles were evaluated.

Comparative Example 4

A hundred parts by weight of 2-ethylhexyl acrylate, 4 parts by weight of hydroxyethyl acrylate, 0.2 parts by weight of 2,2'-azobisisobutyronitrile (manufactured by Kishida Chemical Co., Ltd.) as a polymerization initiator, and ethyl acetate were introduced into a reaction vessel equipped with a stirrer, a thermometer, a nitrogen gas introduction pipe, and a condenser. While the contents were kept being stirred gently, nitrogen gas was introduced to conduct nitrogen displacement. Thereafter, a polymerization reaction was conducted for 10 hours while keeping the temperature of the liquid within the flask at about 60° C., thereby preparing a solution of an acrylic polymer B (solid content of the solution, 50 wt %).

Four parts by weight of an isocyanate crosslinking agent (CORONATE HX, manufactured by Nippon Polyurethane Co., Ltd.) and 0.015 parts by weight of dioctyltin dilaurate (EMBILIZER OL-1, manufactured by Tokyo Fine Chemical Co., Ltd.) as an additive were added to the solution of the acrylic polymer B per 100 parts by weight of the solid component of the solution. The mixture was mixed and stirred until it became even. Thus, an acrylic adhesive composition G for adhesive-layer formation was prepared.

A sheet-shaped adhesive article and a linear adhesive article were produced in the same manners as in Example 1, except that the acrylic adhesive composition G was used in place of the aqueous-dispersion type acrylic adhesive composition A of Example 1.

The thus-obtained sheet-shaped adhesive article and linear adhesive article were stored at 40° C. for 7 days.

The sheet-shaped adhesive article and linear adhesive article which had undergone the storage were taken as sheet-shaped adhesive article and linear adhesive article of Comparative Example 4.

[Determination of Gel Content]

An about 0.1-g portion (weight, W1) of the adhesive was taken out of each of the adhesive sheets of Examples 1 to 6 and Comparative Examples 1 to 4 and wrapped in a porous polytetrafluoroethylene (PTFE) film having an average pore diameter of 0.2 μm (weight, W2) to form a purse-shaped package, and the mouth thereof was fastened with a kite string (weight, W3). This package was immersed in 50 mL of ethyl acetate and held at room temperature (typically 23° C.) for 7 days to dissolve out only a sol component of the adhesive layer through the film. Thereafter, the package was taken out and the ethyl acetate adherent to the outer surface thereof was wiped off. This package was dried at 130° C. for 1 hour, and the weight (W4) of the package was measured. The gel content (initial) (F1) of the adhesive layer of each of the Examples and Comparative Examples was determined by substituting the values into the following equation (1).

$$\text{Gel content (\%)} = [(W4 - W2 - W3)/W1] \times 100 \quad (1)$$

As the porous PTFE, film, use was made of trade name "NITOFLON NTF1122" (average pore diameter, 0.2 μm; porosity, 75%; thickness, 85 μm), available from Nitto Denko Corp.

The collection of the adhesive was conducted just after the production of each adhesive sheet.

[Determination of Change in Gel Content]

The adhesive sheets obtained in Examples 1 to 6 and Comparative Examples 1 to 4 were each stored at 40° C. for 7 days from the production and then examined for the gel content (after 40° C.×7 days) (F2) of the adhesive layer by the same operation as shown above.

The change (%) of the gel content of the adhesive layer of each of Examples 1 to 6 and Comparative Examples 1 to 4 was determined by substituting the gel content (initial) (F1) and the gel content (after 40° C.×7 days) (F2) into the following equation (2).

$$\text{Change in gel content (\%)} = F2 - F1 \qquad (2)$$

[Measurement of Self-Adhesive Forces of the Sheet-Shaped Adhesive Articles]

A sheet strip having a length of 100 mm and a width of 10 mm was cut out of each of the adhesive sheets obtained in Examples 1 to 6 and Comparative Examples 1 to 4. Portions of the adhesive surface (adhesive layer) of the sheet strip were put together and press-bonded to each other under the conditions of 0.4 MPa to produce a specimen. At 20 minutes after the press bonding, the produced specimen was examined with a tensile tester (apparatus: Autograph AG-IS, manufactured by Shimadzu Corp.) in accordance with JIS Z0237 to peel the adhesive surfaces of the specimen (PET film/adhesive layer/adhesive layer/PET film) from each other in an atmosphere of 23° C. and 50% R.H. under the conditions of a peeling speed of 100 mm/min and a peel angle of 180°. Thus, the 180°-peel adhesive force (N/10 mm) was measured as self-adhesive force (initial). The state of the adhesive surfaces was examined.

In cases when the adhesive layers were able to be separated at the interface between the two adhesive surfaces and the separated surfaces were smooth, then this state was expressed by "interfacial separation". In cases when the interface between the two adhesive surfaces had become unclear and at least either of the adhesive layers broke to result in rough separated surfaces having orange peel, this state was expressed by "cohesive failure".

Specimens were produced in the same manner from the adhesive sheets obtained in Examples 1 to 6 and Comparative Examples 1 to 4 and were stored at 40° C. for 7 days from the press bonding. These specimens were then examined for 180°-peel adhesive force in the same manner. This adhesive force was taken as self-adhesive force (after 40° C.×7 days). The state of the adhesive surfaces was examined.

[Measurement of Adhesive Forces of the Sheet-Shaped Adhesive Articles]

The adhesive layer of each of the adhesive sheets obtained in Examples 1 to 6 and Comparative Examples 1 to 4 was protected with a separator, and these adhesive sheets were stored at 40° C. for 7 days. Thereafter, sheet strips having a length of 100 mm and a width of 20 mm were cut out thereof to produce specimens.

The adhesive surface (adhesive layer) of each specimen was press-bonded to SUS 304BA under the conditions of rolling a 2-kg roller forward and backward once. At 20 minutes after the press bonding, the specimen was peeled off using a tensile tester (apparatus: Autograph AG-IS, manufactured by Shimadzu Corp.) in accordance with JIS Z0237 under the conditions of a peeling speed of 300 mm/min and a peel angle of 180° to measure the adhesive force (N/20 mm).

[Measurement of Self-Adhesive Forces of Linear Adhesive Articles]

Two linear-adhesive-article segments having a length of 100 mm were cut out of each of the adhesive articles obtained in Examples 1 to 6 and Comparative Examples 1 to 4, and the adhesive layers thereof were put together. Thereafter, the stacked linear-adhesive-article segments were protected with a separator and press-bonded to each other under the conditions of rolling a 2-kg roller forward and backward once, thereby obtaining a specimen. At 20 minutes after the press bonding, the produced specimen was examined by pulling both ends of the specimen using a tensile tester (apparatus: Autograph AG-IS, manufactured by Shimadzu Corp.) in an atmosphere of 23° C. and 50% R.H. under the conditions of a peeling speed of 100 mm/min and a peel angle of 180°, thereby peeling the adhesive layers from each other. Thus, the resistance force (N) required for peeling the stacked linear-adhesive-article segments of the specimen was measured as self-adhesive force (initial).

A specimen was produced in the same manner from each of the adhesive articles obtained in Examples 1 to 6 and Comparative Examples 1 to 4 and was stored at 40° C. for 7 days from the press bonding. The specimen was then examined for the resistance force (N) required for peeling the stacked linear-adhesive-article segments of the specimen in the same manner as for the self-adhesive force (initial). The force thus measured was taken as self-adhesive force (after 40° C.×7 days).

Furthermore, after the measurements of the initial self-adhesive force and self-adhesive force after 40° C.×7 days of each of the linear adhesive articles obtained in Examples 1 to 6 and Comparative Examples 1 to 4, the state of the adhesive surfaces was examined. In cases when the adhesive layers were able to be separated at the interface between the two adhesive surfaces, this state was expressed by "interfacial separation". In cases when the self-adhesive force of the adhesive layers was so high that the adhesive peeled off the core material to expose the core material, this state was expressed by "exposure of core material".

[Measurement of Adhesive Forces of the Linear Adhesive Articles]

A 150-mm-long portion was cut out of each of the linear adhesive articles obtained in Examples 1 to 6 and Comparative Examples 1 to 4 to obtain a specimen. The adhesive surface (adhesive layer) of the specimen was press-bonded to SUS 304BA under the conditions of rolling a 2-kg roller forward and backward once. At 20 minutes after the press bonding, the specimen was peeled off using a tensile tester (apparatus: Autograph AG-IS, manufactured by Shimadzu Corp.) in accordance with JIS Z0237 under the conditions of a peeling speed of 300 mm/min and a peel angle of 180° to measure the adhesive force (N/specimen) (initial).

The adhesive surface (adhesive layer) of the linear adhesive article obtained by each of the Examples 1 to 6 and Comparative Examples 1 to 4 was protected with a separator and this linear adhesive article was stored at 40° C. for 7 days. Thereafter, a specimen was produced and examined for adhesive force (after 40° C.×7 days) in the same manner.

In Table 1 are shown the results of examining each sample for gel content, change in gel content, self-adhesive force, state of the adhesive surface, and adhesive force.

TABLE 1

|  |  |  | Example |  |  |  |  |  |
|---|---|---|---|---|---|---|---|---|
|  |  |  | Example 1 | Example 2 | Example 3 | Example 4 | Example 5 | Example 6 |
| Gel content [%] |  | Initial | 39 | 31 | 27 | 53 | 28 | 47 |
|  |  | After 40° C. × 7 days | 41 | 34 | 28 | 55 | 32 | 47 |
|  |  | Change | 2 | 3 | 1 | 2 | 4 | 0 |
| Sheet-shaped | Self-adhesive force [N/10 mm] | Initial | 4.5 | 5.5 | 7.4 | 1.8 | 4.5 | 1.8 |
|  |  | After 40° C. × 7 days | 4.5 | 5.5 | 8.3 | 1.7 | 6.7 | 1.9 |
|  | Separated interface | Initial | interfacial separation | interfacial separation | interfacial separation | interfacial separation | interfacial separation | interfacial separation |
|  |  | After 40° C. × 7 days | interfacial separation | interfacial separation | interfacial separation | interfacial separation | interfacial separation | interfacial separation |
|  | Adhesive force [N/20 mm] | After 40° C. × 7 days | 9.0 | 8.0 | 6.0 | 3.9 | 8.0 | 3.9 |
| Linear | Self-adhesive force [N/specimen] | Initial | 0.2 | 0.3 | 0.3 | 0.3 | 0.3 | 0.0 |
|  |  | After 40° C. × 7 days | 0.3 | 0.2 | 0.3 | 0.4 | 0.5 | 0.0 |
|  | State of adhesive surface | Initial | interfacial separation | interfacial separation | interfacial separation | interfacial separation | interfacial separation | interfacial separation |
|  |  | After 40° C. × 7 days | interfacial separation | interfacial separation | interfacial separation | interfacial separation | interfacial separation | interfacial separation |
|  | Adhesive force [N/specimen] | Initial | 0.1 | 0.1 | 0.1 | 0.02 | 0.02 | 0.01 |
|  |  | After 40° C. × 7 days | 0.03 | 0.5 | 0.5 | 0.1 | 0.03 | 0.01 |

|  |  |  | Comparative Example |  |  |  |
|---|---|---|---|---|---|---|
|  |  |  | Comparative Example 1 | Comparative Example 2 | Comparative Example 3 | Comparative Example 4 |
| Gel content [%] |  | Initial | 1.8 | 6 | 2.8 | 97 |
|  |  | After 40° C. × 7 days | 32 | 51 | 3.4 | 97 |
|  |  | Change | 30.2 | 45 | 0.6 | 0 |
| Sheet-shaped | Self-adhesive force [N/10 mm] | Initial | 8.0 | 6.5 | 1.9 | 0.01 |
|  |  | After 40° C. × 7 days | 12.7 | 16 | 11.8 | 0.01 |
|  | Separated interface | Initial | cohesive failure | interfacial separation | cohesive failure | interfacial separation |
|  |  | After 40° C. × 7 days | cohesive failure | cohesive failure | cohesive failure | interfacial separation |
|  | Adhesive force [N/20 mm] | After 40° C. × 7 days | 12.5 | 7.6 | 5.2 | 0.01 |
| Linear | Self-adhesive force [N/specimen] | Initial | 0.3 | 0.4 | 0.2 | failed to adhere |
|  |  | After 40° C. × 7 days | 0.2 | 0.2 | 0.2 | failed to adhere |
|  | State of adhesive surface | Initial | exposure of core material | exposure of core material | exposure of core material | — |
|  |  | After 40° C. × 7 days | exposure of core material | exposure of core material | exposure of core material | — |
|  | Adhesive force [N/specimen] | Initial | 0.3 | 0.02 | 0.1 | failed to adhere |
|  |  | After 40° C. × 7 days | 0.1 | 0.1 | 0.1 | failed to adhere |

The adhesive articles of Examples 1 to 6 each had a high gel content even just after the sample production (initial) and showed a smaller change in gel content, in terms of comparison between the initial value and the value after 40° C. storage for 7 days from press bonding, than Comparative Examples 1 and 2. This indicates that the state of the resins included in the adhesive layers of Examples 1 to 6 changed little.

The sheet-shaped adhesive articles of Examples 1 to 6 and Comparative Examples 1 to 3 each showed a sufficiently high force of adhesion to the adherend. The sheet-shaped adhesive article of Comparative Example 4 did not show a sufficient adhesive force. In each of the sheet-shaped adhesive articles of Comparative Examples 1 and 3, the interface between the two adhesive layers in contact with each other had become unclear and at least either of the adhesive layers broke upon peeling to result in a rough separated surface having orange peel. In the adhesive article of Comparative Example 2, in the initial examination, the adhesive layers in contact with each other were able to be separated at the interface therebetween and the separated surfaces were not rough. However, after the specimen had been stored at 40° C. for 7 days after press bonding, the interface between the two adhesive layers in contact with each other had become unclear and at least either of the adhesive layers broke upon peeling to result in rough separated surfaces having orange peel. Meanwhile, in each of the sheet-shaped adhesive articles of Examples 1 to 6, the adhesive layers even after having been stored at 40° C. for 7 days after press bonding were able to be separated at the interface between the two adhesive surfaces like the adhesive layers in the initial examination. The results further showed that the adhesive layers in contact with each other were able to be separated at the interface therebetween and the separated surfaces were not rough.

In each of the linear adhesive articles of Examples 1 to 6, the adhesive layers even after having been stored at 40° C. for 7 days after press bonding were able to be separated at the interface between the two adhesive surfaces like the adhesive layers in the initial examination. Meanwhile, in each of the linear adhesive articles of Comparative Examples 1 to 3, when the specimen was pulled, separation occurred not at the interface between the two adhesive layers in contact with each other but at the interface between at least either of the adhesive layers and the core material(s), resulting in core-material exposure.

INDUSTRIAL APPLICABILITY

The present invention provides an adhesive article which requires no separator and exhibits sufficient adhesive force without requiring an operation for adhesive-force development and in which, even when portions of the adhesive layer are in contact with each other, the portions can be separated from each other at the interface therebetween.

While the invention has been described in detail and with reference to specific embodiments thereof, it will be apparent to one skilled in the art that various changes and modifications can be made therein without departing from the spirit and scope thereof.

This application is based on a Japanese patent application filed on Feb. 21, 2018 (Application No. 2018-28998), a Japanese patent application filed on Jun. 29, 2018 (Application No. 2018-125111), and a Japanese patent application filed on Jul. 23, 2018 (Application No. 2018-137760), the contents thereof being incorporated herein by reference.

REFERENCE SIGNS LIST

100, 200, 300 Adhesive article
2, 3, 4 Adhesive body
13 Adhesive layer
14 Core material
20 Substrate

The invention claimed is:

1. An adhesive article, comprising:
   an adhesive body comprising an adhesive layer,
   wherein
   the adhesive layer has a gel content of 5-70%,
   the adhesive layer comprises an acrylic adhesive,
   the acrylic adhesive comprises an acrylic polymer as a base polymer,
   the acrylic polymer is a product of polymerization of starting-material monomers comprising an acrylic monomer as a main component of the starting-material monomers,
   the adhesive layer has an outer surface that, when the adhesive article is wound into a roll form, has surface portions that directly contact one another,
   the adhesive layer includes a silane crosslinking agent,
   an amount of the silane crosslinking agent per 100 parts by weight of the starting-material monomers is in the range of 0.005 to 0.03 parts to 0.03 parts by weight, and
   the adhesive article, through 7-day storage at 40° C., has a change in the gel content of the adhesive layer of −5% to 5%.

2. The adhesive article according to claim 1, wherein the adhesive layer further comprises at least one adhesive selected from the group consisting of urethane-based adhesives, silicone-based adhesives, rubber-based adhesives, and polyester-based adhesives.

3. The adhesive article according to claim 1, wherein the adhesive body is linear.

4. The adhesive article according to claim 3, wherein the adhesive body further includes a linear core material, and a longitudinal-direction surface of the core material is covered with the adhesive layer.

5. The adhesive article according to claim 1, wherein the adhesive body is in a form obtained by winding the adhesive body into a roll.

* * * * *